US009765892B2

(12) United States Patent
Itadani et al.

(10) Patent No.: US 9,765,892 B2
(45) Date of Patent: Sep. 19, 2017

(54) SLIDING COMPONENT (71) Applicant: EAGLE INDUSTRY CO., LTD., Tokyo (JP)

(72) Inventors: Masatoshi Itadani, Tokyo (JP); Yuichiro Tokunaga, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 15/121,665

(22) PCT Filed: Jun. 25, 2015

(86) PCT No.: PCT/JP2015/068315
§ 371 (c)(1),
(2) Date: Aug. 25, 2016

(87) PCT Pub. No.: WO2015/199171
PCT Pub. Date: Dec. 30, 2015

(65) Prior Publication Data
US 2017/0167615 A1    Jun. 15, 2017

(30) Foreign Application Priority Data
Jun. 26, 2014    (JP) ................................. 2014-131055

(51) Int. Cl.
*F16J 15/34* (2006.01)
*F16J 15/40* (2006.01)

(52) U.S. Cl.
CPC .............. *F16J 15/34* (2013.01); *F16J 15/40* (2013.01)

(58) Field of Classification Search
CPC  F16J 15/16; F16J 15/162; F16J 15/182; F16J 15/324; F16J 15/3244; F16J 15/3408; F16J 15/3412; F16J 15/3424
See application file for complete search history.

(56) References Cited

U.S. PATENT DOCUMENTS

| 9,347,566 B2 | 5/2016 | Tokunaga | F16J 15/3412 |
| 2005/0212217 A1* | 9/2005 | Tejima | F16J 15/3412 |
| | | | 277/399 |

(Continued)

FOREIGN PATENT DOCUMENTS

| CN | 2622494 | 6/2004 | ............... F16J 15/42 |
| CN | 201896950 | 7/2011 | ............... F16J 15/40 |

(Continued)

OTHER PUBLICATIONS

International Preliminary Report on Patentability issued in application No. PCT/JP2015/068315, dated Dec. 27, 2016 (5 pgs).

(Continued)

*Primary Examiner* — Gilbert Lee
(74) *Attorney, Agent, or Firm* — Hayes Soloway P.C.

(57) ABSTRACT

A sliding component has a plurality of dimples provided independently in a circumferential direction on one sealing face of a pair of sliding components relatively sliding to each other. A cavitation formation region on an upstream side of each dimple is disposed closer to a low-pressure fluid side and a positive pressure generation region on a downstream side of each dimple is disposed closer to a high-pressure fluid side, and an edge on the low-pressure fluid side of the positive pressure generation region is formed into a tapered shape inclined with respect to the rotating direction of the other sealing face toward the high-pressure fluid side from the low-pressure fluid side and is smoothly connected to an edge on the low-pressure fluid side of the cavitation formation region.

6 Claims, 6 Drawing Sheets

(56) References Cited

U.S. PATENT DOCUMENTS

| | | | | |
|---|---|---|---|---|
| 2012/0280458 A1* | 11/2012 | Artiles | ................ | F16J 15/3412 |
| | | | | 277/411 |
| 2013/0200573 A1* | 8/2013 | Garrison | .................. | F16J 9/24 |
| | | | | 277/457 |
| 2013/0209011 A1* | 8/2013 | Tokunaga | ............. | F16C 17/045 |
| | | | | 384/123 |
| 2015/0115537 A1 | 4/2015 | Tokunaga | ................ | F16J 15/34 |

FOREIGN PATENT DOCUMENTS

| | | | | |
|---|---|---|---|---|
| CN | 102359596 | | 2/2012 | ............... F16J 15/34 |
| CN | 102779112 | | 11/2012 | ............... F16J 15/40 |
| CN | 103185140 | | 7/2013 | ............... F16J 15/16 |
| CN | 103470773 | | 12/2013 | ............... F16J 15/40 |
| JP | 59231269 A | * | 12/1984 | ........... F16J 15/3412 |
| JP | H08193662 | | 7/1996 | ............... F16J 15/34 |
| WO | WO2012046749 | | 4/2012 | ............... F16C 17/04 |
| WO | WO2014050920 | | 4/2014 | ............... F16J 15/34 |
| WO | WO2014061544 | | 4/2014 | ............... F16J 15/32 |

OTHER PUBLICATIONS

International Search Report and Written Opinion issued in application No. PCT/JP2015/068315, dated Aug. 4, 2015 (6 pgs).
Chinese Patent Office First Office Action issued in corresponding Application Serial No. 201580012448.8 dated Mar. 29, 2017 (13 Pages).
Fluid Machinery article "Study on Opening Characteristics of Dry Gas Seals with Radial Tapered Goose Grooves" written by Liu et al., published Aug. 3, 2013 (3 Pages).

* cited by examiner

SLIDING COMPONENT

TECHNICAL FIELD

The present invention relates, for example, to a sliding component suitable for mechanical seals, bearings, and other sliding parts. In particular, the present invention relates to a sliding component for sealing rings, bearings, and the like required to reduce friction by interposing a fluid between sealing faces and to prevent leakage of the fluid from the sealing faces.

BACKGROUND ART

In the mechanical seal which is an example of a sliding component, in order to maintain sealing performance in the long term, conflicting conditions of "sealing" and "lubrication" are required to be balanced. Particularly, in recent years, for environmental measures, the demand for reducing friction is further increasing in order to reduce mechanical loss while preventing leakage of the sealed fluid. As the technique for reducing friction, it can be achieved by sliding the faces in a state that dynamic pressure is generated between the sealing faces by means of rotation and a liquid film is interposed therebetween, that is, by creating the so-called fluid lubrication state. However, in this case, positive pressure generates between the sealing faces, so the fluid flows out of the sealing faces from a positive pressure portion. This is the so-called side leakage in bearings and corresponds to leakage in the case of seals.

In liquid seals, liquid has a higher viscosity than gas, so a dynamic pressure effect is obtained due to fine waviness and roughness irregularity of the faces and the like even if they are plain faces. Therefore, a structure giving priority to sealing performance is often adopted. On the other hand, in order to balance "sealing" and "lubrication", several mechanisms having a pumping effect of pulling the leaked liquid back to the high-pressure side are devised. For example, Patent Citation 1 discloses an invention in which a plurality of spiral grooves for transferring a fluid to a high-pressure chamber side are provided in the circumferential direction on a sealing face of a rotating ring (hereinafter, referred to as "Background Art 1").

Figure 6:
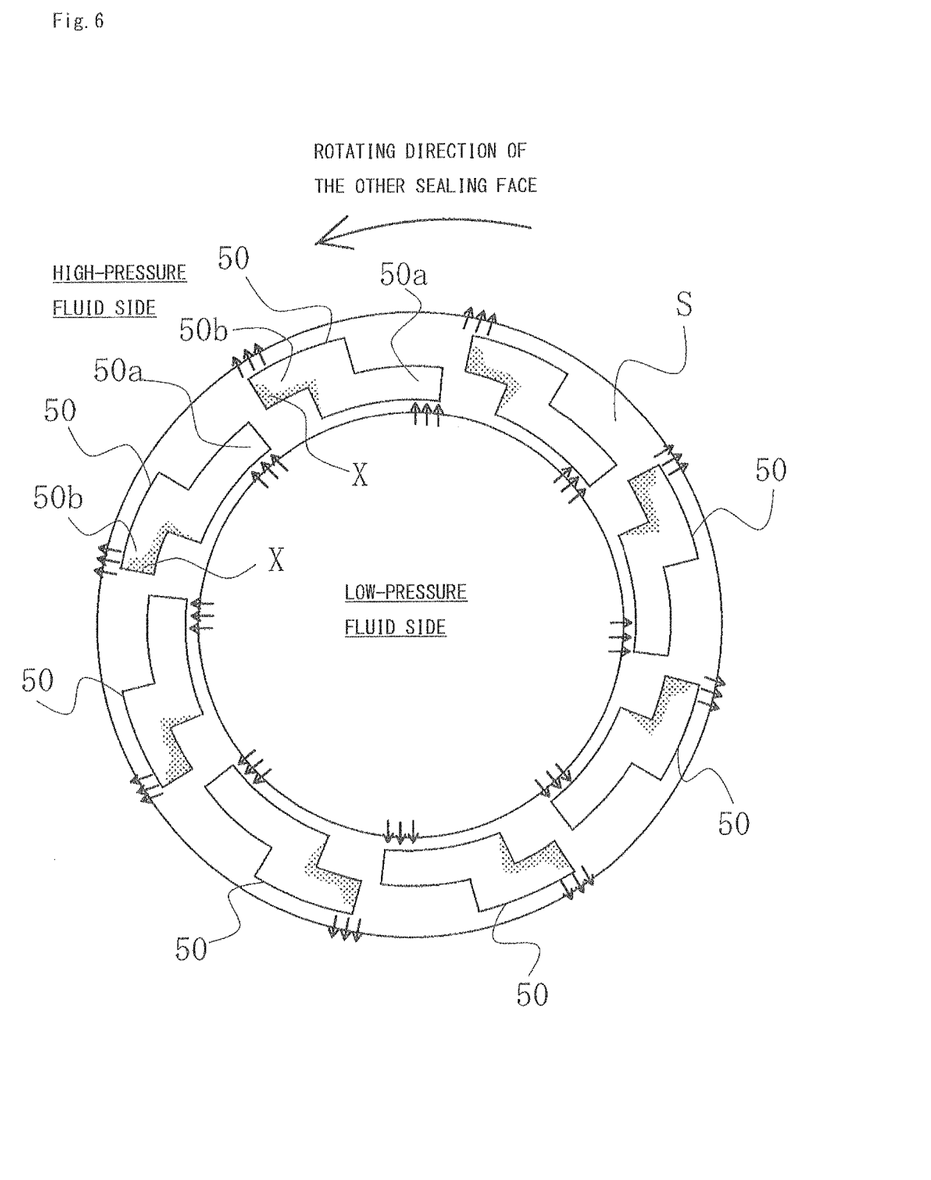
FIG. 6 shows a sealing face of Patent Citation 2.

Moreover, as an invention relating to a sliding component, the present applicant earlier applied for an invention in which, as shown in FIG. 6, a plurality of dimples 50 are provided on a sealing face S, a cavitation formation region 50$a$ on the upstream side of each dimple 50 is disposed closer to a low-pressure fluid side and a positive pressure generation region 50$b$ on the downstream side is disposed closer to a high-pressure fluid side, the fluid is sucked in the cavitation formation region 50$a$ on the upstream side, and the sucked fluid is returned from the positive pressure generation region 50$b$ on the downstream side to the high-pressure side (hereinafter, referred to as "Background Art 2". See Patent Citation 2.).

However, in the above Prior Art 1, if there is a pressure difference between the inner and outer peripheries of the sealing face, a pumping action against pressure is required, and it may be impossible to push back the fluid depending on the magnitude of pressure. Therefore, there was a problem in that, although it is possible to prevent leakage if the pressure difference is small, the leakage amount must be increased if the pressure difference is large.

Moreover, although the above Prior Art 2 is a breakthrough invention in terms of exhibiting both functions of leak prevention and lubrication regardless of the magnitude of the pressure difference of the inner and outer peripheries of the sealing face, the basic shape of each dimple 50 is a crank shape, thereby slightly lacking smoothness in fluid movement from the cavitation formation region 50$a$ on the upstream side to the positive pressure generation region 50$b$ on the downstream side. Therefore, there was a problem in that the generation of dynamic pressure in the low-pressure fluid side X of the positive pressure generation region 50$b$ is excessive, and the distance from the pressure peak position of the dynamic pressure generation region to the low-pressure fluid side cannot be formed so large, which might lead to leakage.

CITATION LIST

Patent Literature

Patent Citation 1: Japanese Laid-open Patent Publication No. H08-193662 (Page 4, FIGS. 5, 6)

Patent Citation 2: PCT International Publication No. WO/2014/050920

SUMMARY OF INVENTION

Technical Problem

The present invention relates to an improvement of the invention described in the above Patent Citation 2, and an object thereof is to provide a sliding component with both function of further leak prevention and lubrication regardless of the magnitude of the pressure difference of the inner and outer peripheries of a sealing face by smoothing fluid movement from a cavitation formation region on the upstream side of a depressed portion (referred to as a "dimple" in the present specification) such as a dimple formed on the sealing face to a positive pressure generation region on the downstream side.

Moreover, another object of the present invention is to provide a sliding component further improving a function of leak prevention by arranging the cavitation formation region over whole circumference in a low-pressure fluid side of the sealing face.

Solution to Problem

In order to achieve the above objects, in a first aspect, a sliding component of the present invention is characterized in that a plurality of dimples are provided independently in the circumferential direction on one sealing face of a pair of sliding components relatively sliding to each other, a cavitation formation region on an upstream side of each dimple is disposed closer to a low-pressure fluid side and a positive pressure generation region on a downstream side of each dimple is disposed closer to a high-pressure fluid side, and an edge on the low-pressure fluid side of the positive pressure generation region is formed into a tapered shape inclined with respect to rotating direction of the other sealing face toward the high-pressure fluid side from the low-pressure fluid side and is smoothly connected to an edge on the low-pressure fluid side of the cavitation formation region.

According to the first aspect, fluid movement from the cavitation formation region on the upstream side formed on the sealing face to the positive pressure generation region on the downstream side can be smoothed, so the positive pressure does not rise in the flow of the fluid colliding with the edge on the low-pressure fluid side, and therefore, dynamic pressure generation on the low-pressure fluid side at the terminal end of the positive pressure generation region can be suppressed, and the amount of the fluid to be leaked to the low-pressure fluid side can be reduced. Moreover, a positive pressure generation part where positive pressure is generated in the positive pressure generation region is a portion near the high-pressure fluid side, so the distance from the pressure peak position of the positive pressure generation part to the low-pressure fluid side is increased, and as a result, the pressure gradient is decreased, and the leakage amount can be reduced.

Moreover, in a second aspect, the sliding component according to the first aspect of the present invention is characterized in that a starting end on the upstream side of the cavitation formation region is formed into a tapered shape inclined with respect to the rotating direction of the other sealing face of the pair of sliding components toward the high-pressure fluid side from the low-pressure fluid side, and is arranged so as to overlap in a radial direction with the positive pressure generation region of the dimple disposed on the upstream side.

According to the second aspect, the fluid that tends to leak from the positive pressure generation region of the dimples on the upstream side to the low-pressure fluid side flows into the upstream side of the cavitation formation region of the dimples on the downstream side, thus leakage to the low-pressure fluid side is prevented and sealing performance is increased. Moreover, arrangement efficiency of the dimples in the sealing face can be improved.

Moreover, in a third aspect, the sliding component according to the first or second aspect of the present invention is characterized in that a positive pressure generation mechanism comprising a Rayleigh step communicated with the high-pressure fluid side via a radius-direction groove is provided on the high-pressure fluid side of the sealing face where the dimples are provided or on the high-pressure fluid side of the other sealing face, a pressure release groove is provided between the positive pressure generation mechanism and the dimples, and the pressure release groove is communicated with the high-pressure fluid side via the radius-direction groove.

According to the third aspect, the sliding component is capable of lubrication by forming a fluid film with the positive pressure generation mechanism comprising the Rayleigh step arranged on the high-pressure fluid side, and capable of sealing and lubrication with the dimples arranged on the low-pressure fluid side, and thus the sealing action by the dimples can be ensured.

Moreover, in a fourth aspect, the sliding component according to the first or second aspect of the present invention is characterized in that a positive pressure generation mechanism comprising a Rayleigh step communicated with the high-pressure fluid side is provided on the high-pressure fluid side of the sealing face where the dimples are provided or on the high-pressure fluid side of the other sealing face.

According to the fourth aspect, the sliding component is capable of lubrication by forming the fluid film with the positive pressure generation mechanism comprising the Rayleigh step arranged on the high-pressure fluid side, and capable of sealing and lubrication with the dimples arranged on the low-pressure fluid side, and deep grooves such as a radius-direction groove and a pressure-release groove do not need to be provided, and therefore it has the advantage that the processing is easy.

Advantageous Effects of Invention

The present invention exhibits the following superior effects.

(1) According to the first aspect, the edge on the low-pressure fluid side of the positive pressure generation region is formed into a tapered shape inclined with respect to the rotating direction of the other sealing face toward the high-pressure fluid side from the low-pressure fluid side and is smoothly connected to the edge on the low-pressure fluid side of the cavitation formation region, thereby fluid movement from the cavitation formation region on the upstream side formed on the sealing face to the positive pressure generation region on the downstream side can be smoothed, so the positive pressure does not rise in the flow of the fluid colliding with the edge on the low-pressure fluid side, and therefore, dynamic pressure generation on the low-pressure fluid side at the terminal end of the positive pressure generation region can be suppressed, and the amount of the fluid to be leaked to the low-pressure fluid side can be reduced. Moreover, the positive pressure generation part where positive pressure is generated in the positive pressure generation region is a portion near the high-pressure fluid side, so the distance from the pressure peak position of the positive pressure generation part to the low-pressure fluid side is increased, and as a result, the pressure gradient is decreased, and the leakage amount can be reduced.

(2) According to the second aspect, the starting end on the upstream side of the cavitation formation region is formed into a tapered shape inclined with respect to the rotating direction of the other sealing face toward the high-pressure fluid side from the low-pressure fluid side, and is arranged so as to overlap in the radial direction with the positive pressure generation region of the dimple disposed on the upstream side, thereby the fluid that tends to leak from the positive pressure generation region of the dimples on the upstream side to the low-pressure fluid side flows into the upstream side of the cavitation formation region of the dimples on the downstream side, thus leakage to the low-pressure fluid side is prevented and sealing performance is increased. Moreover, arrangement efficiency of the dimples in the sealing face can be improved.

(3) According to the third aspect, the positive pressure generation mechanism comprising the Rayleigh step communicated with the high-pressure fluid side via the radius-direction groove is provided on the high-pressure fluid side of the sealing face where the dimples are provided or on the high-pressure fluid side of the other sealing face, the pressure release groove is provided between the positive pressure generation mechanism and the dimples, and the pressure release groove is communicated with the high-pressure fluid side via the radius-direction groove, thereby the sliding component is capable of lubrication by forming the fluid film with the positive pressure generation mechanism comprising the Rayleigh step arranged on the high-pressure fluid side, and capable of sealing and lubrication with the dimples arranged on the low-pressure fluid side, and thus the sealing action by the dimples can be ensured.

(4) According to the fourth aspect, the positive pressure generation mechanism comprising the Rayleigh step communicated with the high-pressure fluid side is provided on the high pressure fluid side of the sealing face where the dimples are provided or on the high-pressure fluid side of the other sealing face, thereby the sliding component is capable of lubrication by forming the fluid film with the positive pressure generation mechanism comprising the Rayleigh step arranged on the high-pressure fluid side, and capable of sealing and lubrication with the dimples arranged on the low-pressure fluid side, and deep grooves such as a radius-direction groove and a pressure release groove do not need to be provided, and therefore it has the advantage that the processing is easy.

DESCRIPTION OF EMBODIMENTS

Hereinafter, with reference to the drawings, modes for carrying out the present invention will be illustratively described based on embodiments. It should be noted that, unless otherwise expressly stated, the dimensions, materials, shapes, relative arrangements and the like of the components described in the embodiments are not intended to limit the scope of the present invention to only them.

First Embodiment

Figure 1:
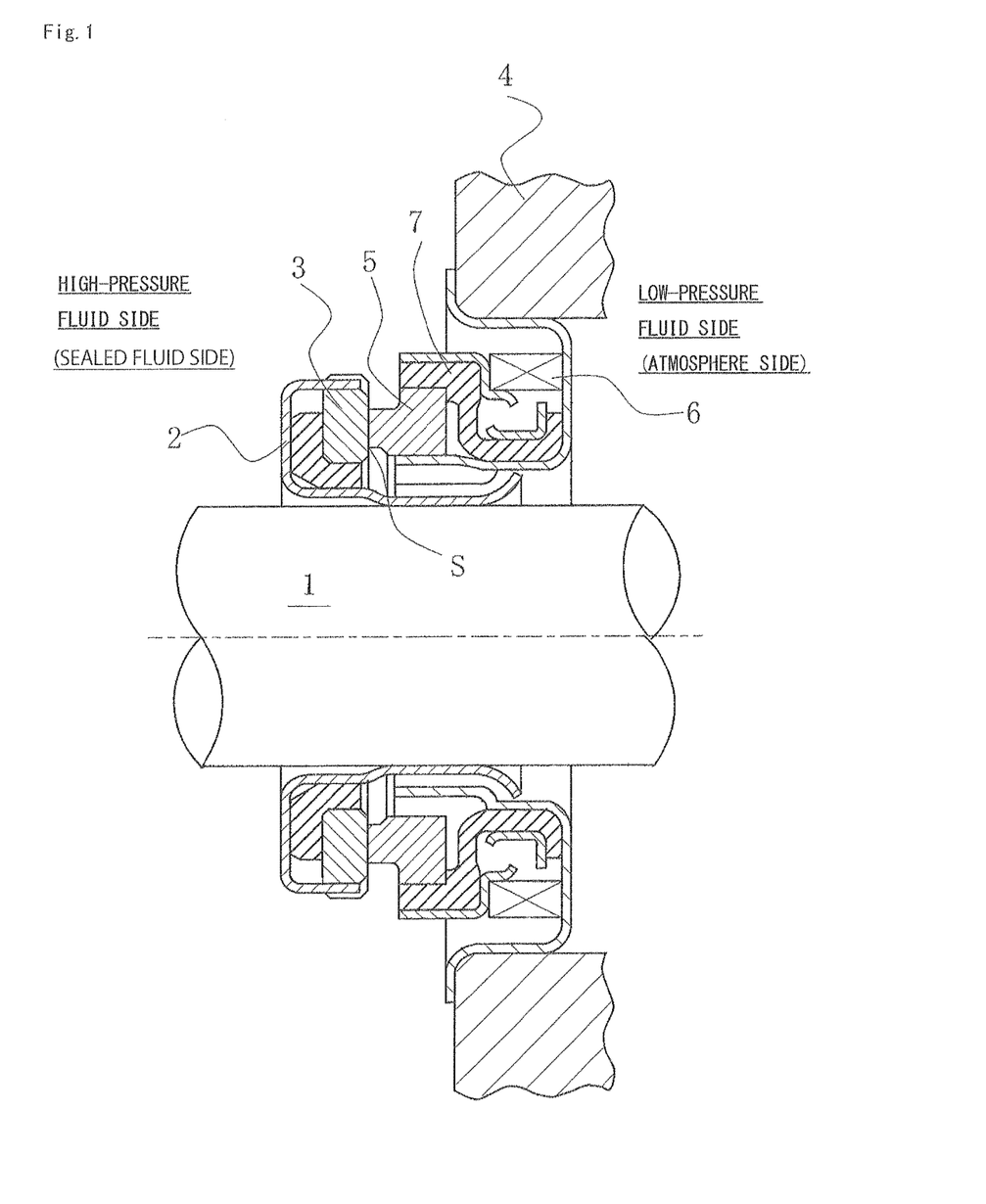
FIG. 1 is a longitudinal cross-sectional view showing an example of a mechanical seal according to embodiments of the present invention.
Figure 2:
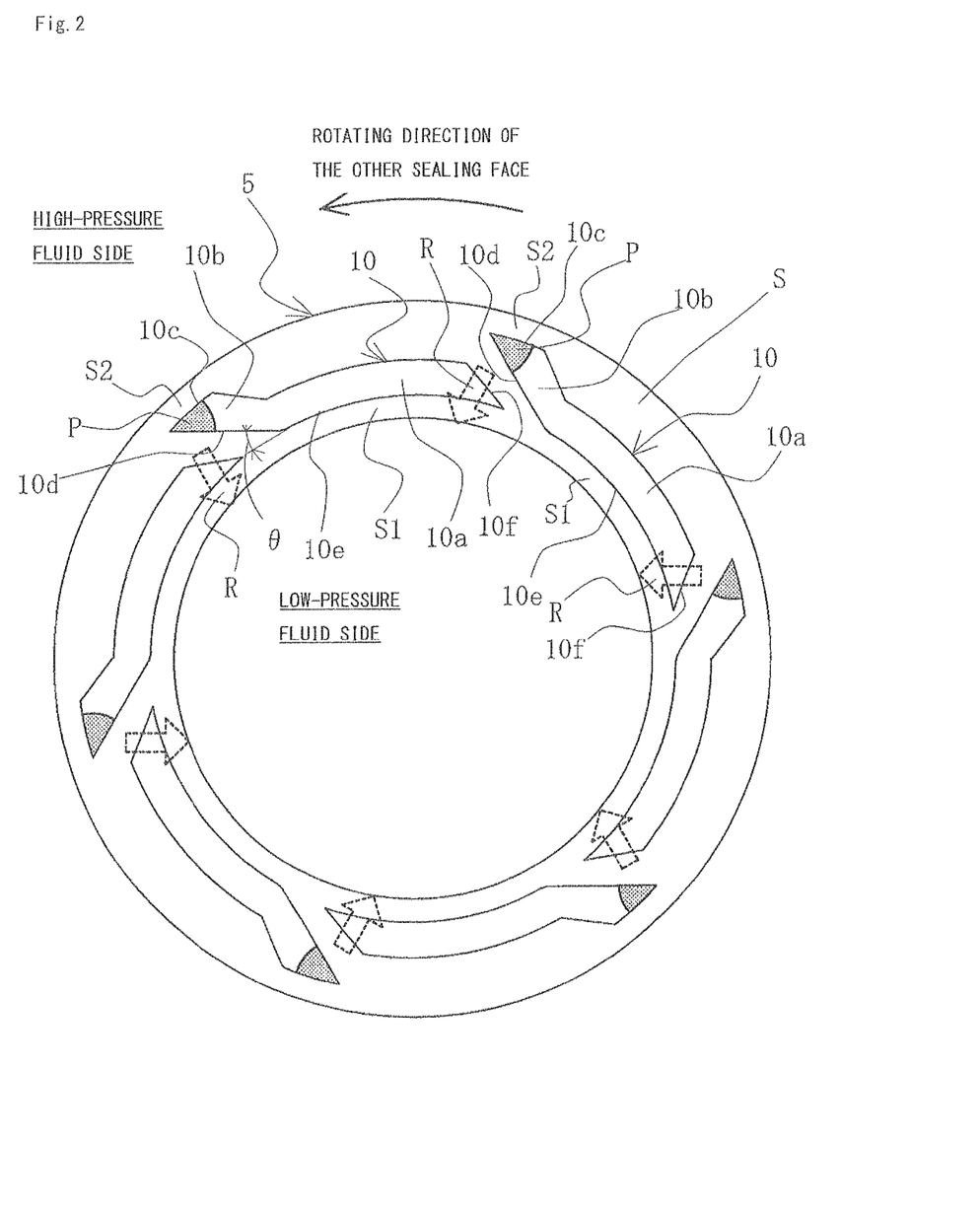
FIG. 2 shows a sealing face of a sliding component according to a first embodiment of the present invention.
Figure 3A:
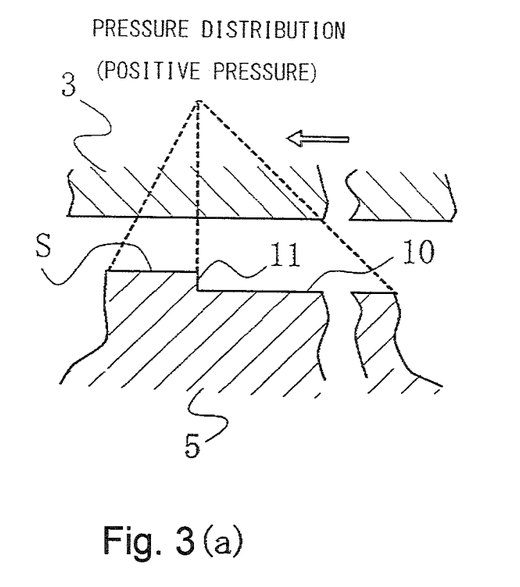
FIG. 3(a) is a drawing for explaining a positive pressure generation mechanism comprising a narrowing gap (step) on the downstream side of a dimple.
Figure 3B:
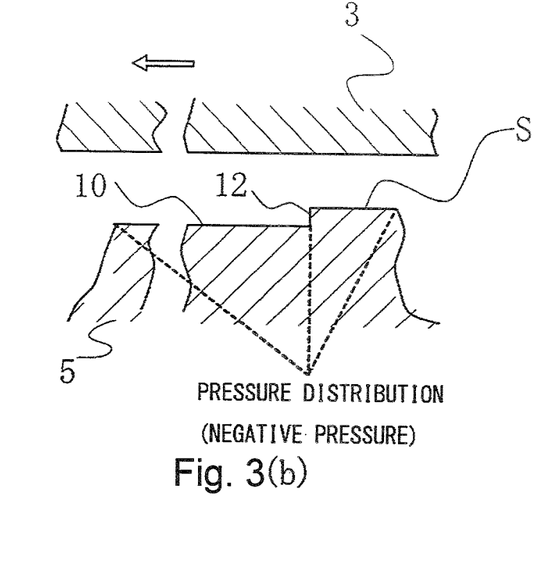
FIG. 3(b) is a drawing for explaining a negative pressure generation mechanism comprising an expanding gap (step) on the upstream side of a dimple.

With reference to FIG. 1 to FIG. 3, a sliding component according to a first embodiment of the present invention will be described.

It should be noted that, in the present embodiment, the case where a component constituting a mechanical seal is a sliding component will be described as an example.

FIG. 1 is a longitudinal cross-sectional view showing an example of a mechanical seal, and the mechanical seal is of the inside type that seals a sealed fluid on a high-pressure fluid side that is likely to leak from the outer periphery toward the inner periphery of the sealing face. An annular rotating ring 3 is provided on the side of a rotating shaft 1 that drives a pump impeller (not shown) on the high-pressure fluid side via a sleeve 2 in a state to be rotatable integrally with the rotating shaft 1. An annular stationary ring 5 is provided on a housing 4 of the pump in a state to be not rotatable but axially movable. The annular rotating ring 3 and the annular stationary ring 5 are closely slid on their sealing faces S mirror-finished by lapping or the like, by means of a coiled wave spring 6 and a bellows 7 that bias the stationary ring 5 in the axial direction. In other words, this mechanical seal prevents the sealed fluid from flowing out toward the atmosphere side from the outer periphery of the rotating shaft 1, in the sealing faces S of the rotating ring 3 and the stationary ring 5.

It goes without saying that the present invention can be applied not only to mechanical seals of the inside type but also to mechanical seals of the outside type that seal the sealed fluid on the high-pressure fluid side that tends to leak from the inner periphery toward the outer periphery of the sealing face.

FIG. 2 shows a sealing face of the sliding component according to the first embodiment of the present invention, and the case where dimples are formed on the sealing face of the stationary ring 5 in FIG. 1 will be described as an example.

It should be noted that the same applies to the case where dimples are formed on the sealing face of the rotating ring 3.

In FIG. 2, a plurality of dimples 10 are provided on the sealing face S in the circumferential direction. The dimples 10 are not communicated with the high-pressure fluid side and the low-pressure fluid side, and the respective dimples 10 are provided independently from each other so as to be spaced in the circumferential direction. While the number, area, and depth of dimples 10 are determined appropriately in response to the diameter of the sliding component, the width and relative movement speed of the sealing face, as well as sealing and lubrication conditions, and the like, the dimples having a large area and a shallow depth in point of fluid lubrication action and liquid film formation are more preferable. In the case of FIG. 2, the dimples 10 are provided with six equal intervals.

The respective dimples 10 are formed into such a shape that a cavitation formation region 10a on the upstream side is disposed closer to the low-pressure fluid side, a positive pressure generation region 10b on the downstream side is disposed closer to the high-pressure fluid side, and these two regions are communicated with each other. As a result, the fluid suctioned in the cavitation formation region 10a of each dimple 10 generates dynamic pressure (positive pressure) in the positive pressure generation region 10b through the dimple and returns to the high-pressure fluid side near the radial direction.

The cavitation formation region 10a on the upstream side of each dimple 10 shown in FIG. 2 is arranged separately from the low-pressure fluid side via a sealing face S1 having a constant width and extends with a constant width in the circumferential direction so as to form an arc shape. The positive pressure generation region 10b on the downstream side extends so as to be inclined with respect to the rotating direction of the other sealing face toward the high-pressure fluid side from the cavitation formation region 10a and is arranged adjacent to the high-pressure fluid side at a terminal end 10c thereof but separately from the high-pressure fluid side via a sealing face S2 having a constant width. Then, an edge 10d on the low-pressure fluid side of the positive pressure generation region 10b is formed into a tapered shape inclined with respect to the rotating direction of the other sealing face toward the high-pressure fluid side from the low-pressure fluid side and is smoothly connected to an edge 10e on the low-pressure fluid side of the cavitation formation region 10a.

The edge 10d of the low-pressure fluid side of the positive pressure generation region 10b may not be limited to a straight line and may be a curved line convex or concave to the low-pressure fluid side. A single straight line is desirable in the case that a plurality of straight lines defining the edge 10, and it is desirable that curvature is uniform in the case of a curved line.

As described above, the edge 10d on the low-pressure fluid side of the positive pressure generation region 10b is formed into a tapered shape inclined with respect to the rotating direction of the other sealing face toward the high-pressure fluid side from the low-pressure fluid side and is smoothly connected to the edge 10e on the low-pressure fluid side of the cavitation formation region 10a, thereby the fluid flowing into the cavitation formation region 10a flows smoothly to the positive pressure generation region 10b. Hence, the positive pressure does not rise in the flow of the fluid colliding with the edge 10d on the low-pressure fluid side, and as a result, dynamic pressure generation on the low-pressure fluid side at the terminal end of the positive pressure generation region 10b can be suppressed compared to the sliding component of the above Prior Art 2, and the amount of the fluid to be leaked to the low-pressure fluid side can be reduced. Moreover, the positive pressure generation part where positive pressure is generated in the positive pressure generation region 10b is a portion of a generally triangular region P shown by hatching in FIG. 2, so the distance from the pressure peak position on the terminal end side to the low-pressure fluid side is increased, and as a result, the pressure gradient is decreased, and the leakage amount can be reduced.

On that occasion, it is desirable that a taper angle of the edge 10d on the low-pressure fluid side of the positive pressure generation region 10b be small as much as possible from the viewpoint of allowing the fluid colliding with the edge 10d on the low-pressure fluid side to flow smoothly and of not allowing the positive pressure to rise. For example, the taper angle θ is set to 0°<θ≤45°.

On the other hand, a starting end 10f on the upstream side of the cavitation formation region 10a of each dimple 10 is formed into a tapered shape inclined with respect to the rotating direction of the other sealing face toward the high-pressure fluid side from the low-pressure fluid side, and is arranged so as to overlap in the radial direction with the positive pressure generation region 10b of the dimple 10 disposed on the upstream side.

Specifically, the starting end 10f on the upstream side of the cavitation formation region 10a is formed into a tapered shape inclined so as to be almost parallel to the edge 10d on the low-pressure fluid side of the positive pressure generation region 10b of the dimple 10 disposed on the upstream side, and is arranged so as to overlap in the radial direction with the positive pressure generation region 10b of the dimple 10 disposed on the upstream side. Therefore, the fluid, shown by an arrow R, that tends to leak from the positive pressure generation region 10b of the dimple 10 on the upstream side to the low-pressure fluid side flows into the upstream side of the cavitation formation region 10a of the dimple 10 on the downstream side, thus leakage to the low-pressure fluid side is prevented and sealing performance is increased. Moreover, arrangement efficiency of the dimples in the sealing face S (ratio of the total area of the dimples to the total area of the sealing face) can be improved.

It should be noted that the fact that the starting end 10f on the upstream side and the edge 10d on the low-pressure fluid side are "almost parallel" means that the intersection angle of them is in a range of 0° to 30°.

The shape of the dimples 10 shown in FIG. 2 is merely an example thereof. In short, in the case where the cavitation formation region 10a on the upstream side is disposed closer to the low-pressure fluid side, and the positive pressure generation region 10b on the downstream side is disposed closer to the high-pressure fluid side, as for the positive pressure generation region 10b, the edge 10d on the low-pressure fluid side of the positive pressure generation region 10b may be formed into a tapered shape inclined with respect to the rotating direction of the other sealing face toward the high-pressure fluid side from the low-pressure fluid side and be smoothly connected to the edge 10e on the low-pressure fluid side of the cavitation formation region 10a. Examples of the shape include such a shape that the terminal end part is bent at an obtuse angle and smoothly connected, to a body part, like the side geometry of the top end part of a ski plate.

Moreover, as for the cavitation formation region 10a, the starting end 10f may be formed into a tapered shape inclined with respect to the rotating direction of the other sealing face toward the high-pressure fluid side from the low-pressure fluid side, and be arranged so as to overlap in the radial direction with the positive pressure generation region 10b of the dimple 10 disposed on the upstream side. The taper angle, the degree of overlapping in the radial direction with the positive pressure generation region 10b of the dimple 10 on the upstream side, and the like may be determined depending upon design.

Now, with reference to FIG. 3, a positive pressure generation mechanism and a negative pressure generation mechanism in the case where the dimples in the present invention are provided will be described.

In FIG. 3(a), as shown by the arrow, the rotating ring 3 moves rotationally in the counterclockwise direction with respect to the stationary ring 5. In this case, if the dimples 10 are formed on the sealing face S of the stationary ring 5, a narrowing gap (step) 11 exists on the downstream side of the dimples 10. The sealing face of the facing rotating ring 3 is flat.

When the rotating ring 3 moves relatively in the direction shown by the arrow, the fluid interposed between the sealing faces of the rotating ring 3 and the stationary ring 5 tends to move to follow the moving direction of the rotating ring 3 due to its viscosity, and therefore, on that occasion, the dynamic pressure (positive pressure) shown by the broken line is generated due to the presence of the narrowing gap (step) 11.

In FIG. 3(b), as shown by the arrow, the rotating ring 3 moves rotationally in the counterclockwise direction with respect to the stationary ring 5. In this case, if the dimples 10 are formed on the sealing face S of the stationary ring 5, an expanding gap (step) 12 exists on the upstream side of the dimples 10. The sealing face of the facing rotating ring 3 is flat.

When the rotating ring 3 moves relatively in the direction shown by the arrow, the fluid interposed between the sealing faces of the rotating ring 3 and the stationary ring 5 tends to move to follow the moving direction of the rotating ring 3 due to its viscosity, and therefore, on that occasion, the dynamic pressure (negative pressure) shown by the broken line is generated due to the presence of the expanding gap (step) 12.

Therefore, the negative pressure is generated on the upstream side within the dimples 10, and the positive pressure is generated on the downstream side. Then, cavitation occurs in the negative pressure generation region on the upstream side.

Second Embodiment

Figure 4:
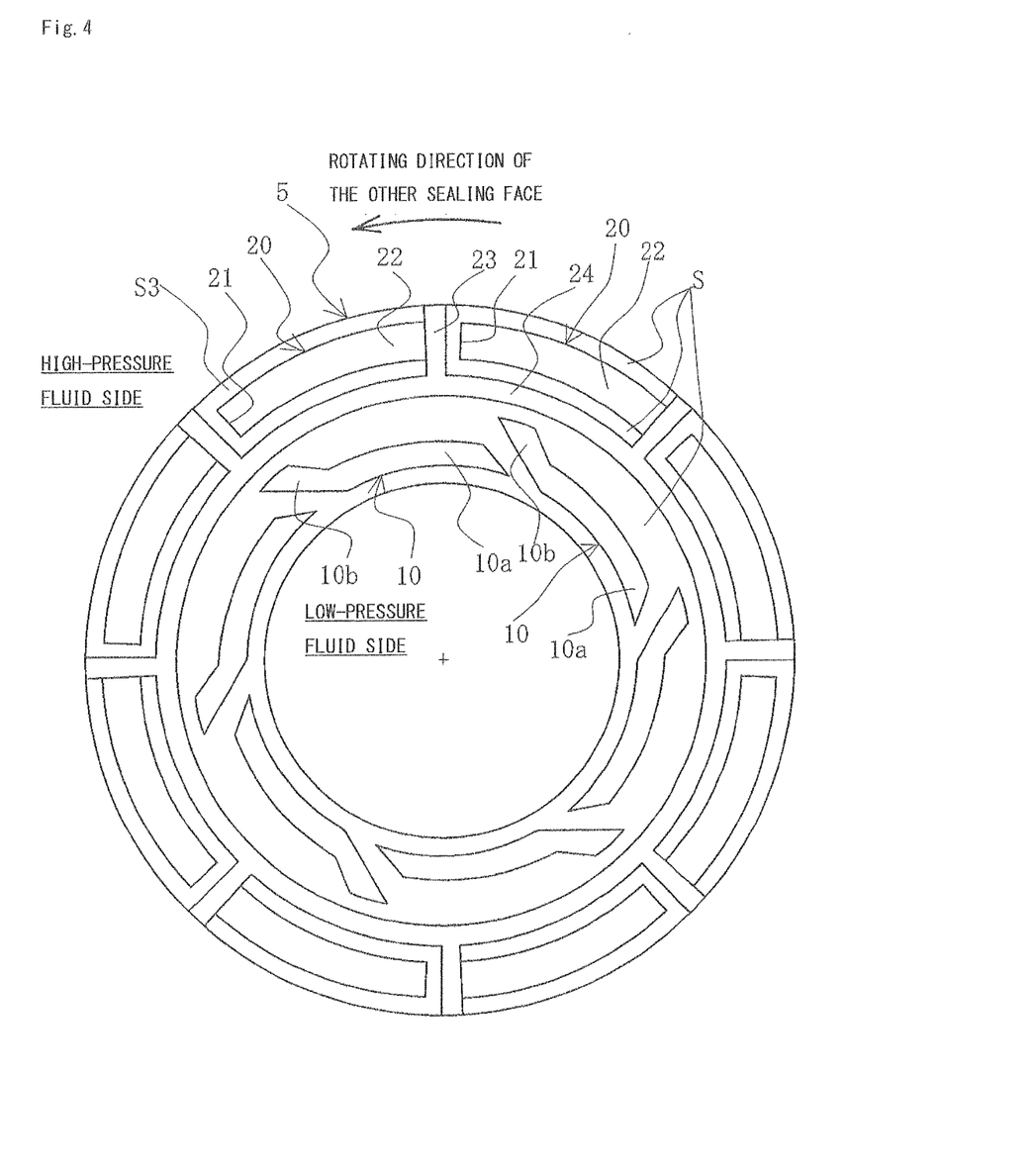
FIG. 4 shows a sealing face of a sliding component according to a second embodiment of the present invention.

FIG. 4 shows a sealing face of a sliding component according to a second embodiment of the present invention, and the case where dimples are formed on the sealing face of the stationary ring 5 in FIG. 1 will be described as an example. The second embodiment is different from the first embodiment shown in FIG. 2 in that a positive pressure generation mechanism comprising a Rayleigh step is arranged on the high-pressure fluid side of the sealing face where the dimples are provided, but other respects are basically the same as the first embodiment, so the same members are denoted by the same signs, and a repetitive description will be omitted.

In FIG. 4, in the sealing face S, dimples 10 are arranged on the low-pressure fluid side, and a positive pressure generation mechanism comprising a Rayleigh step 20 is arranged on the high-pressure fluid side.

The Rayleigh step 20 is composed of a narrowing step 21, a groove part 22, and a radius-direction groove 23 communicated with the high-pressure fluid side, and a pressure release groove 24 communicated with the high-pressure fluid side via the radius-direction groove 23 is provided between the Rayleigh step 20 and the dimple 10. The groove part 22 is arranged separately from the high-pressure fluid side via a sealing face S3 having a constant width, and extends with a constant width in the circumferential direction so as to form an arc shape. The depth of the groove part 22 is several times the depth of the dimple 10. The pressure release groove 24 is intended to release the dynamic pressure (positive pressure) generated in the Rayleigh step 20 to the pressure of the fluid on the high-pressure side so as to prevent the fluid from flowing into the dimple 10 on the low-pressure fluid side and thereby weakening negative pressure generation capacity of the dimple 10, and is served to guide the fluid flowing into the low-pressure fluid side to the pressure release groove 24 by the positive pressure generated in the Rayleigh step 20 on the high-pressure fluid side and allow the fluid to escape to the high-pressure fluid side.

In the case of FIG. 4, the dimples 10 are provided with six equal intervals, and the Rayleigh steps 20 are provided with eight equal intervals.

The depths and widths of the groove part 22, the radius-direction groove 23, and the pressure release groove 24 have the nature of being determined appropriately in response to the diameter of the sliding component, the width and relative movement speed of the sealing face, as well as sealing and lubrication conditions, and the like. For example, the depth of the groove part 22 is half to several times the depth of the dimple 10, and the depths of the radius-direction groove 23 and the pressure release groove 24 are more than ten times the depth of the dimple 10.

In the second embodiment, a fluid film is formed for lubrication by the positive pressure generation mechanism comprising the Rayleigh step 20 arranged on the high-pressure fluid side, while the dimple 10 arranged on the low-pressure fluid side is used for sealing and lubrication, and the fluid suctioned in the cavitation formation region 10a of the dimple 10 is guided from the positive pressure generation region 10b to the pressure release groove 24 and returned to the high-pressure fluid side via the radius-direction groove 23. In this way, in the present embodiment, the sliding component is capable of lubrication by forming a fluid film with the positive pressure generation mechanism comprising the Rayleigh step 20 arranged on the high-pressure fluid side, and capable of sealing and lubrication with the dimple 10 arranged on the low-pressure fluid side, and thus the sealing action by the dimples 10 can be ensured.

Third Embodiment

Figure 5:
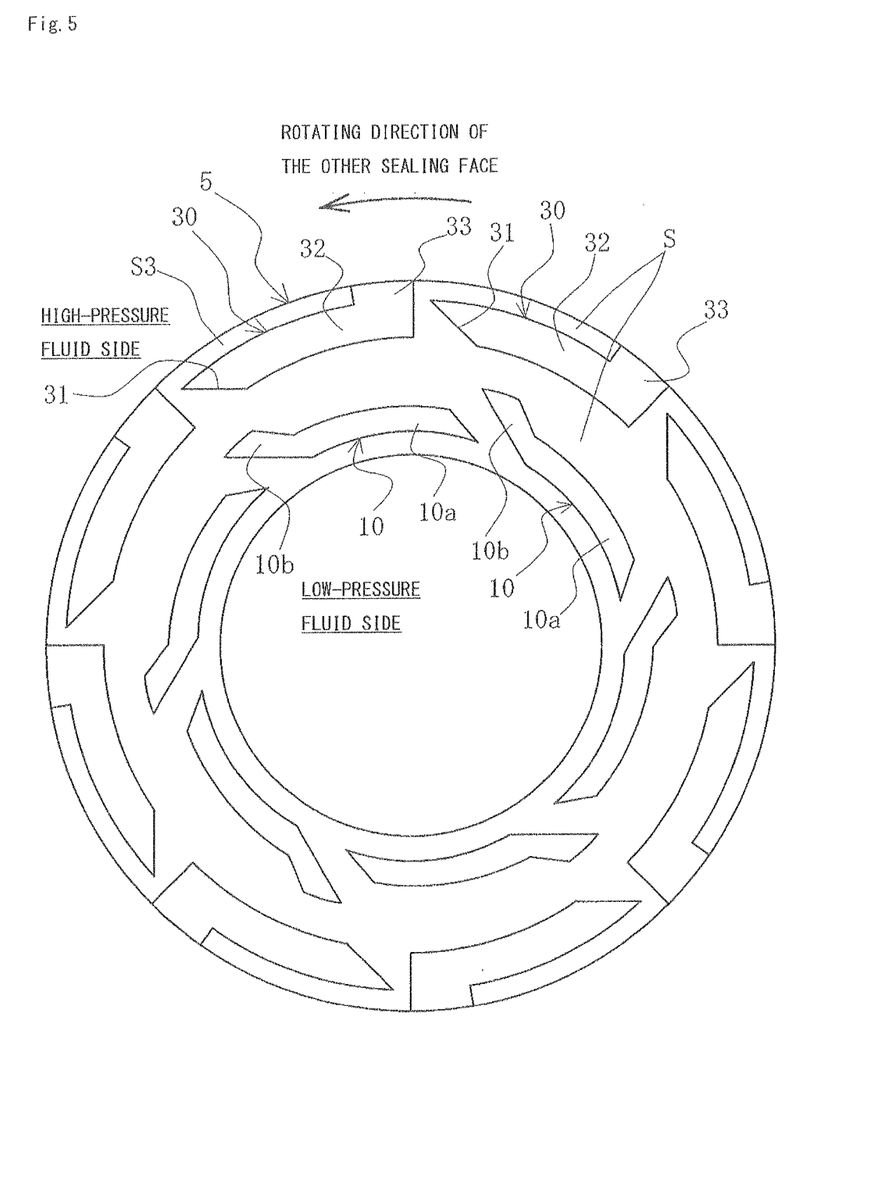
FIG. 5 shows a sealing face of a sliding component according to a third embodiment of the present invention.

FIG. 5 shows a sealing face of a sliding component according to a third embodiment of the present invention, and the case where dimples are formed on the sealing face of the stationary ring 5 in FIG. 1 will be described as an example. The third embodiment is different from the first embodiment shown in FIG. 2 in that a positive pressure generation mechanism comprising a Rayleigh step is arranged on the high-pressure fluid side of the sealing face where the dimples are provided, but other respects are basically the same as the first embodiment, so the same members are denoted by the same signs, and a repetitive description will be omitted.

In FIG. 5, in the sealing face S, dimples 10 are arranged on the low-pressure-fluid side, and a positive pressure generation mechanism comprising a Rayleigh step 30 is arranged on the high-pressure fluid side.

The Rayleigh step 30 is composed of a narrowing step 31, a groove part 32, and a radius-direction groove 33 communicated with the high-pressure fluid side in the upstream side of the groove part 32, and the sealing face S is interposed between the Rayleigh step 30 and the dimple 10.

The groove part 32 is arranged separately from the high-pressure fluid side via the sealing face S3 having a constant width, and extends with a constant width in the circumferential direction so as to form an arc shape. The depth of the groove part 32 is half to several times the depth of the dimple 10.

The narrowing step 31 is formed into a tapered shape inclined with respect to the rotating direction of the other sealing face toward the high-pressure fluid side from the low-pressure fluid side. As thus the narrowing step 31 is formed, the peak of the positive pressure generated near the narrowing step 31 comes close to the high-pressure fluid side, and therefore the high-pressure fluid is discharged mainly to the high-pressure fluid side, and the flow thereof to the dimple 10 side is reduced.

The radius-direction groove 33 has a width equal to, or greater than the width of the groove part 32.

The depth of the radius-direction groove 33 is equal to the depth of the groove part 32 and is several times the depth of the dimple 10. Therefore, the inflow of the high-pressure fluid into the groove part 32 is easy, and lubrication of the sealing face S is sufficiently performed.

In the third embodiment, a fluid film is formed for lubrication by the positive pressure generation mechanism comprising the Rayleigh step 30 arranged on the high-pressure fluid side, while the dimple 10 arranged on the low-pressure fluid side is used for sealing and lubrication. The fluid suctioned in the cavitation formation region 10a of the dimple 10 is returned to the high-pressure fluid side from the positive pressure generation region 10b while lubricating the sealing face S. In the third embodiment, deep grooves such as the radius-direction groove 23 and the pressure release groove 24 do not need to be provided as in the second embodiment, and therefore it has the advantage that the processing is easy.

Hereinbefore, the embodiments of the present invention were described using the drawings, but specific configurations are not limited to these embodiments, and even other changes and additions without departing from the scope of the present invention are also included in the present invention.

For example, in the above embodiments, the example where the sliding component is used for one of a pair of the rotating sealing ring and the stationary sealing ring in a mechanical seal device was described, but it is also possible to use it as a sliding component for a bearing that slides with a rotating shaft while sealing lubrication oil on the axial one side of the cylindrical sealing face.

Moreover, for example, in the above embodiments, the case where the high-pressure sealed fluid exists on the outer periphery side was described, but the present invention can be applied to the case where the high-pressure fluid is present on the inner periphery side, and in that case, the arrangement may be such that the cavitation formation region and the positive pressure generation region of the dimple are located on the outer periphery side and the inner periphery side respectively.

Moreover, in the above embodiments, as for the shape of the dimples, the cavitation formation region 10a on the upstream side extends with a constant width in the circumferential direction so as to form an arc shape, and the positive pressure generation region 10b shows the shape extending so as to be inclined with respect to the rotating direction of the other sealing face toward the high-pressure fluid side from the cavitation formation region 10a while having an approximately same width as the width of the cavitation formation region 10a. However, the present invention is not limited thereto, and the cavitation formation region 10a and the positive pressure generation region 10b may be arranged so as to be different in their width, for example.

Moreover, in the second and third embodiments, the case where, of the rotating ring 3 and the stationary ring 5, the dimples 10 and the positive pressure generation mechanisms comprising each Rayleigh step 20, 30 are arranged on the sealing face of the stationary ring 5 was described, but the present invention is not limited thereto, and they may be arranged on the sealing face of the rotating ring 3. Moreover, the dimples 10 may be provided on the sealing face of either the rotating ring 3 or the stationary ring 5, and the positive pressure generation mechanisms comprising each Rayleigh step 20, 30 may be provided on the other sealing face. For example, the dimples 10 may be arranged on the sealing face of the rotating ring 3 and the positive pressure generation mechanisms comprising each Rayleigh step 20, 30 may be arranged on the sealing face of the stationary ring 5, and in that case, the sealing function and the lubrication function can be further improved. It should be noted that the radius-direction groove 23 and the pressure release groove 24 are arranged on the side where the positive pressure generation mechanism comprising the Rayleigh step 20 is provided.

REFERENCE SIGNS LIST

1 Rotating shaft
2 Sleeve
3 Rotating ring
4 Housing
5 Stationary ring
6 Coiled wave spring
7 Bellows
10 Dimple
10a Cavitation formation region
10b Positive pressure generation region
10c Terminal end of the positive pressure generation region
10d Edge on the low-pressure fluid side of the positive pressure generation region
10e Edge on the low-pressure fluid side of the cavitation formation region
10f Starting end on the upstream side of the cavitation formation region
11 Narrowing gap (step)
12 Expanding gap (step)
20 Rayleigh step (Positive pressure generation mechanism)
21 Narrowing step
22 Groove part (Rayleigh step)
23 Radius-direction groove
24 Pressure release groove
30 Rayleigh step
31 Narrowing step
32 Groove part
33 Radius-direction groove
S Sealing face
P Positive pressure generation part
θ Taper angle
R Fluid that tends to leak from the positive pressure generation region to the low-pressure fluid side

The invention claimed is:

1. A sliding component wherein:
a plurality of dimples are provided independently in a circumferential direction on one sealing face of a pair of sliding components relatively sliding to each other, a cavitation formation region on an upstream side of each dimple is disposed closer to a low-pressure fluid side and extends with a constant width in the circumferential direction so as to form an arc shape, and a positive pressure generation region on a downstream side of each dimple is disposed closer to a high-pressure fluid side, and an edge on the low-pressure fluid side of the positive pressure generation region is formed into a tapered shape inclined to the cavitation formation region forming the arc shape with respect to a rotating direction of the other sealing face toward the high-pressure fluid side from the low-pressure fluid side and is smoothly connected to an edge on the low-pressure fluid side of the cavitation formation region.

2. The sliding component as set forth in claim 1, wherein:
a starting end on the upstream side of the cavitation formation region is formed into a tapered shape inclined with respect to the rotating direction of the other sealing face of the pair of sliding components toward the high-pressure fluid side from the low-pressure fluid side, and is arranged so as to overlap in a radial direction with the positive pressure generation region of the dimple disposed on the upstream side.

3. The sliding component as set forth in claim 1, wherein:
a positive pressure generation mechanism comprising a Rayleigh step communicated with the high-pressure fluid side via a radius-direction groove is provided on the high-pressure fluid side of the sealing face where the dimples are provided or on the high-pressure fluid side of the other sealing face, a pressure release groove is provided between the positive pressure generation mechanism and the dimple, and the pressure release groove is communicated with the high-pressure fluid side via the radius-direction groove.

4. The sliding component as set forth in claim 1, wherein:
a positive pressure generation mechanism comprising a Rayleigh step communicated with the high-pressure fluid side is provided on the high-pressure fluid side of the sealing face where the dimples are provided or on the high-pressure fluid side of the other sealing face.

5. The sliding component as set forth in claim 2, wherein:
a positive pressure generation mechanism comprising a Rayleigh step communicated with the high-pressure fluid side via a radius-direction groove is provided on the high-pressure fluid side of the sealing face where the dimples are provided or on the high-pressure fluid side of the other sealing face, a pressure release groove is provided between the positive pressure generation mechanism and the dimple, and the pressure release groove is communicated with the high-pressure fluid side via the radius-direction groove.

6. The sliding component as set forth in claim 2, wherein:
a positive pressure generation mechanism comprising a Rayleigh step communicated with the high-pressure fluid side is provided on the high-pressure fluid side of the sealing face where the dimples are provided or on the high-pressure fluid side of the other sealing face.

\* \* \* \* \*